United States Patent
Martin et al.

[11] Patent Number: 5,806,661
[45] Date of Patent: Sep. 15, 1998

[54] SENSOR FOR DETECTING LIGHTWEIGHT OBJECTS ON A CONVEYOR

[75] Inventors: John T. Martin, Madeira; Timothy L. Lansberry, Milford; James D. Habegger, Loveland, all of Ohio

[73] Assignee: The Buschman Company, Cincinnati, Ohio

[21] Appl. No.: 808,322

[22] Filed: Feb. 28, 1997

Related U.S. Application Data

[63] Continuation-in-part of Ser. No. 608,358, Feb. 28, 1996, abandoned.

[51] Int. Cl.$^6$ .................................................. B65G 13/06
[52] U.S. Cl. ................................ 198/781.06; 198/781.05
[58] Field of Search ..................... 198/781.01, 781.05, 198/781.06, 781.07, 781.08, 781.09

[56] References Cited

U.S. PATENT DOCUMENTS

| | | |
|---|---|---|
| 1,549,977 | 8/1925 | Hem . |
| 1,707,822 | 4/1929 | Stock . |
| 1,900,150 | 3/1933 | Anderson . |
| 2,544,591 | 3/1951 | Ernst . |
| 2,584,873 | 2/1952 | Hart . |
| 2,914,361 | 11/1959 | Turner . |
| 3,008,773 | 11/1961 | Courtney-Pratt . |
| 3,420,355 | 1/1969 | De Good . |
| 3,513,960 | 5/1970 | Adams . |
| 3,724,642 | 4/1973 | De Good . |
| 3,768,630 | 10/1973 | Inwood et al. . |
| 3,770,102 | 11/1973 | De Good . |
| 4,006,815 | 2/1977 | Werntz . |
| 4,108,303 | 8/1978 | Vogt et al. . |
| 4,108,304 | 8/1978 | McKnight et al. . |
| 4,109,783 | 8/1978 | Vogt . |
| 4,174,777 | 11/1979 | Riehle . |
| 4,219,115 | 8/1980 | Moore . |
| 4,301,914 | 11/1981 | Krammer . |
| 4,441,607 | 4/1984 | Bowman et al. . |
| 4,588,073 | 5/1986 | Abell . |
| 4,605,120 | 8/1986 | Vanderlinde et al. . |
| 4,819,788 | 4/1989 | Van Der Schie . |
| 4,951,808 | 8/1990 | Collins et al. . |
| 5,191,967 | 3/1993 | Woltjer et al. . |
| 5,316,130 | 5/1994 | Heit et al. . |
| 5,348,139 | 9/1994 | Szarkowski et al. . |
| 5,358,097 | 10/1994 | Bakkila et al. . |
| 5,381,716 | 1/1995 | May et al. . |
| 5,398,652 | 3/1995 | Jackson . |
| 5,429,225 | 7/1995 | Schiesses et al. ................. 198/783 X |

*Primary Examiner*—James R. Bidwell
*Attorney, Agent, or Firm*—Frost & Jacobs LLP

[57] ABSTRACT

A sensor for detecting the presence of lightweight objects being conveyed on a conveyor of the type having conveyor rollers. Each conveyor roller is rotatively mounted on a shaft fixed between the conveyor side frames. A selected conveyor shaft has non-rotatively mounted thereon a pair of fulcrum bearings, each located between a conveyor side frame and the adjacent end of the roller mounted on the selected shaft. A pair of sensor arms are provided, each rockably mounted on one of the fulcrum bearings. The sensor arms are substantially identical elongated members having upper ends joined by a shaft on which a plurality of sensor rollers are rotatively mounted. The sensor arms are rockable between a normal position wherein the sensor rollers are elevated above the adjacent conveyor rollers, and a fully depressed position wherein the uppermost surface of the sensor rollers are co-planar with the uppermost surface of the adjacent conveyor rollers. An adjustable balance spring balances the sensor arms and rollers to their normal positions. A two-state switching device is mounted on one of the conveyor side frames and is maintained in a first state by the adjacent one of the sensor arms in its normal position, and is released to its second state by the same sensor arm when the same sensor arm is shifted toward its fully depressed position.

21 Claims, 5 Drawing Sheets

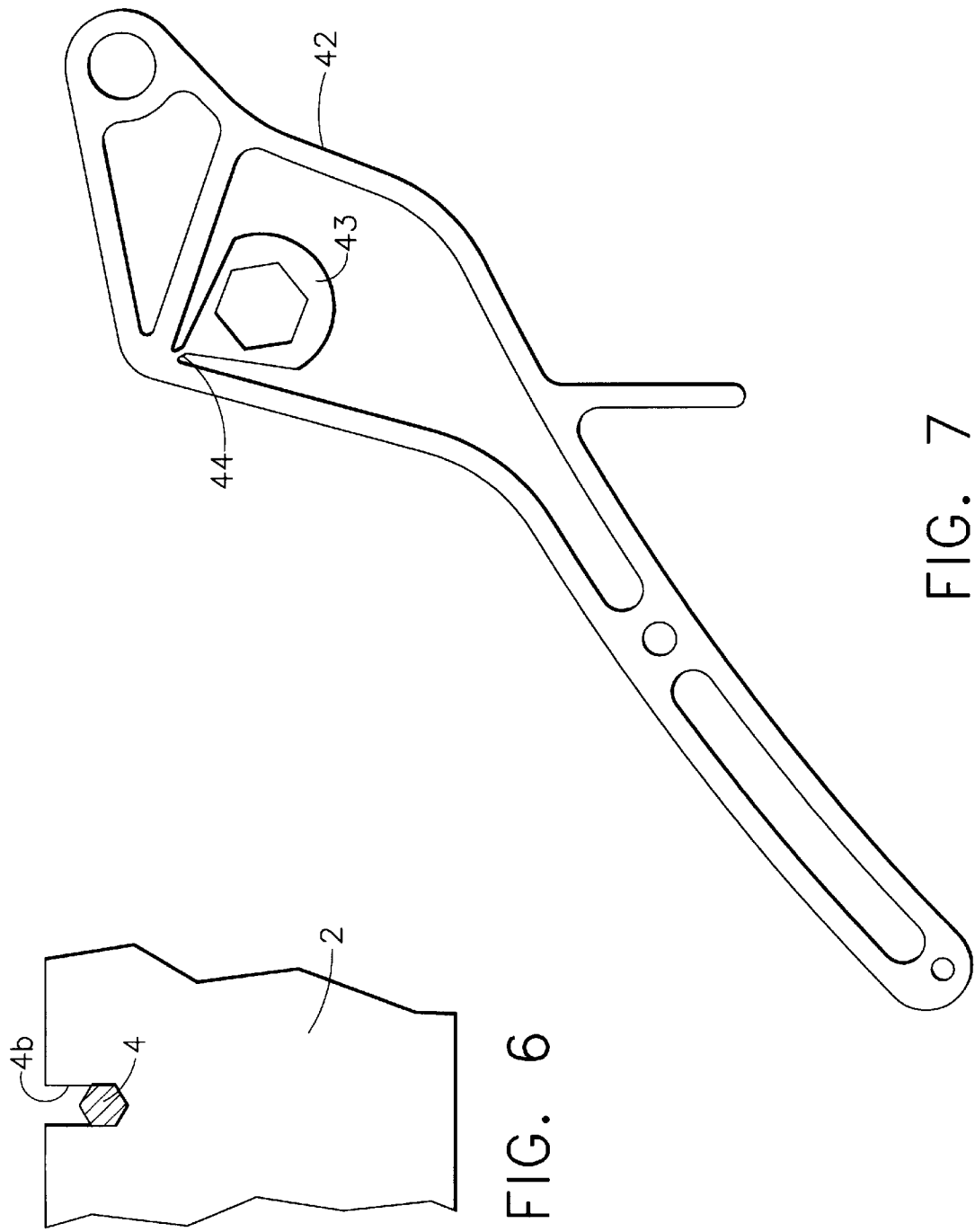

SENSOR FOR DETECTING LIGHTWEIGHT OBJECTS ON A CONVEYOR

REFERENCE TO RELATED APPLICATION

This is a continuation-in-part application of co-pending application Ser. No. 08/608,358, filed Feb. 28, 1996, now abandoned, in the names of John T. Martin and Timothy L. Lansberry, entitled A SENSOR FOR DETECTING LIGHTWEIGHT OBJECTS ON A CONVEYOR.

TECHNICAL FIELD

The invention relates to a mechanical sensor assembly for detecting objects on a conveyor, and more particularly to such a sensor assembly which enables the conveying of lighter objects at greater speeds than hitherto possible with a mechanical sensor.

BACKGROUND ART

Conveyors for products, packages and the like have become highly sophisticated and are used not only for conveying but also for sorting and other operations. In recent years there has been an increase in interest in providing a conveyor with a sensor assembly to detect the presence of a conveyed object at a particular position or zone of the conveyor and to cause something to happen when an object is detected. The sensor may be used to count objects. The rollers of a curved section of a conveyor may be turned on and off by such a sensor.

Perhaps the most common use of a sensor is to control the progress of objects along the conveyor. U.S. Pat. Nos. 4,441,607; 5,191,967; 5,348,139 and 5,358,097 teach exemplary embodiments of conveyors having mechanical sensors for this purpose. In its simplest form, a conveyor is divided into a series of zones, each provided with a sensor. The sensor of each zone, when actuated by a product, will cause the rollers of the next preceding zone (or the second preceding zone depending upon the speed of the conveyor) to stop until the conveyed object in the first mentioned zone passes on and releases the sensor. In most of these systems, the sensor engages and releases the actuating plunger or stem of an air valve. It will be understood by one skilled in the art that the sensor could actuate and release an electrical switch or any appropriate two-state device suitable for controlling the rollers of a preceding zone.

A constant goal of prior art workers is to develop a mechanical sensor for conveyors which is capable of detecting very lightweight objects being conveyed. While it is known that electronic photo-eye technology can be used to detect any object regardless of its weight, electronic photo-eye sensors generally comprise elaborate and very expensive systems. Present prior art mechanical systems have been developed to the point where they can detect objects having a weight of about 1 pound.

The present invention is directed to a mechanical sensor system for the purposes described above, characterized by the use of knife-edge fulcrums for the sensor arms. The sensor assembly is of lightweight construction and the total mass of the sensor assembly has been reduced. As a consequence, the sensor of the present invention is capable of sensing conveyed objects having the weight of 0.38 pound or less.

DISCLOSURE OF THE INVENTION

According to the invention there is provided a sensor assembly for detecting the presence of lightweight objects on a conveyor of the type having conveyor rollers. Each conveyor roller of the conveyor is rotatively mounted on a shaft fixed between the side frames of the conveyor. A selected one of the conveyor rolls is shorter than the others. The shaft of this shorter conveyor roller has non-rotatively fixed thereon a pair of knife-edge fulcrum bearings. Each fulcrum bearing is located between one of the conveyor side frames and the adjacent end of the short conveyor roller.

A pair of sensor arms are each rockably mounted on one of the knife-edge bearings. The sensor arms are elongated members having an upper end and a lower end. The upper ends of the sensor arms are joined together by a shaft having a plurality of lightweight sensor rollers mounted thereon.

The sensor arms are rockable on their knife-edge bearings between a normal position wherein the sensor rollers are elevated above the adjacent conveyor rollers, and an actuated position. An adjustable balance spring balances the sensor assembly, including the sensor arms and rollers, at their normal position.

A two-state device is mounted on one of the conveyor side frames and is maintained in a first state by the adjacent one of the sensor arms in its normal position. The switching device is released to its second state by the same sensor arm when the sensor arm is actuated. The switching device may be of any appropriate type including a pneumatic valve.

It is within the scope of the invention to use the sensing device to control the movement of objects along the conveyor. Furthermore, the conveyor may be divided into zones, each zone being provided with a sensor of the present invention. Finally, it is within the scope of the invention to provide a single zone with two sensors mechanically linked together.

BRIEF DESCRIPTION OF THE DRAWINGS

FIG. 6 is a fragmentary elevational view illustrating the end of a conveyor roller shaft mounted in a vertical slot formed in one of the conveyor side frames.

FIG. 7 is a fragmentary view illustrating a fulcrum bearing attached to a sensor arm by a "living hinge".

DETAILED DESCRIPTION OF THE INVENTION

Figure 1:
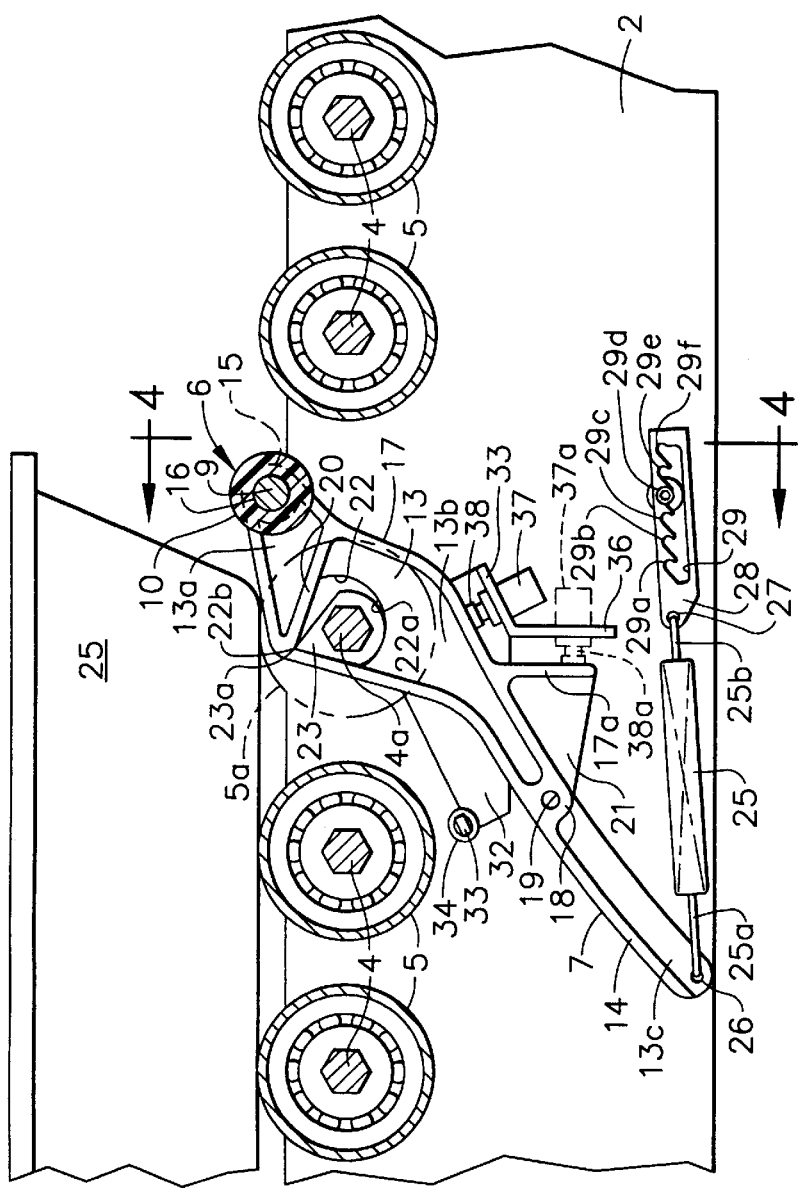
FIG. 1 is a fragmentary longitudinal cross-sectional view of a conveyor provided with the sensor assembly of the present invention, and showing the sensor assembly in its normal, unactuated position.
Figure 3:
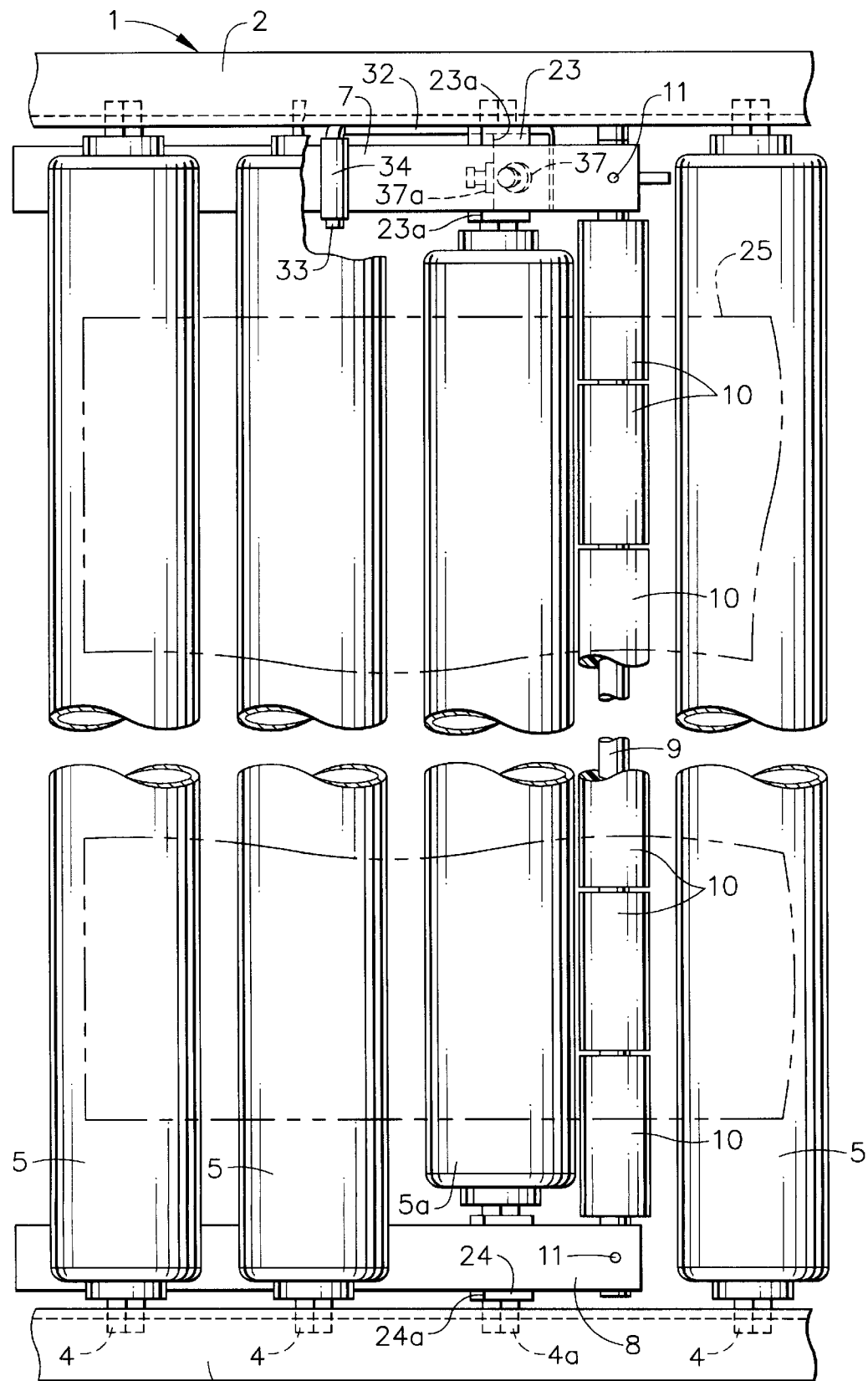
FIG. 3 is a fragmentary plan view of the structure of FIG. 1, as seen along line 3—3 of FIG. 2, and with the object being conveyed shown in broken lines.

In all of the Figures, like parts have been given like index numerals. Reference is first made to FIGS. 1 and 3. In these Figures a conveyor is generally indicated at 1. The conveyor 1 comprises side frames 2 and 3. The side frames 2 and 3 may be mounted on conventional vertical supports or legs (not shown) and will have appropriate transverse bracing (not shown) therebetween, all as is well known in the art.

Conveyor side frames 2 and 3 support a plurality of evenly spaced shafts 4 (including shaft 4a). The shafts 4 and 4a are non-rotatively affixed to side frames 2 and 3 in any appropriate way. In the embodiment illustrated in FIG. 3, the shafts 4 and 4a are of hexagonal cross-section and extend through hexagonal openings in the side frames 2 and 3. As is shown in FIG. 6, the shafts 4 and 4a could be mounted at each end in vertical slots 4b for both convenience and safety. The shaft 4 or 4a can simply be lifted from its respective slots. Each of the shafts 4 has a conveyor roller 5 rotatively mounted thereon with suitable bearings (not shown). It will be noted that conveyor roller shaft 4a carries a conveyor roller (designated 5a) which is identical to conveyor rollers 5, with the exception that it is shorter to make room for the sensor assembly of the present invention, as will be apparent hereinafter.

As indicated heretofore, the conveyor 1 may be divided into a series of zones, each containing a predetermined number of conveyor rollers 5. Each zone may also have a short conveyor roller 5a and a sensor assembly of the present invention which is generally indicated in the Figures at 6. The conveyor rollers 5 and 5a of each zone are capable of being driven so as to convey objects therealong.

Prior art workers have devised a number of ways of powering the conveyor rollers of each zone independently of the conveyor rollers of adjacent zones. The manner in which this is accomplished does not constitute a limitation of the present invention. One of the ways to drive the conveyor rollers of a zone most frequently encountered is to provide a unit beneath the zone comprising a continuous driven belt or padded chain shiftable between an upper position and a lower position. In the lower position, the chain or belt is out of contact with and does not drive the conveyor rollers. In the upper position, the belt or padded chain frictionally engages the conveyor rollers 5 and 5a of its particular conveyor zone, driving the rollers in the desired direction as indicated by arrow A in FIGS. 1 and 3.

Referring to FIG. 3, the sensor 6 comprises a pair of sensor arms 7 and 8. As will be described hereinafter, the sensor arms 7 and 8 are pivotally associated with shaft 4a bearing conveyor roll 5a. The sensor arms are interconnected at their upper ends by a shaft 9 which supports a plurality of sensor rollers 10. The reason shaft 9 preferably bears a plurality of sensor rollers 10, rather than a single sensor roller, will be apparent hereinafter. The sensor rollers are made as lightweight as possible to reduce the overall weight of sensor assembly 6. The sensor rollers may, for example, be hollow plastic rollers. The ends of shaft 9 are non-rotatively affixed to sensor arms 7 and 8 by pins shown at 11, or by any other appropriate means.

While the shaft 9 can be made of any appropriate material such as steel or aluminum rod or tubing, it has been found preferable that shaft 9 constitute a lightweight carbon fiber shaft. Excellent results have been achieved with a pultruded rod of unidirectionally oriented carbon fibers in a vinyl ester resin manufactured by DFI Pultruded Composts, Inc. of Erlanger, Ky. Shaft 9 does not rotate and is subject to bending forces each time a package passes over the sensor rollers. Furthermore, kraft cartons, handled on conveyor systems, often become distorted and catch the sensor rollers 10 imparting considerable force to the rollers 10 and shaft 9. A carbon fiber shaft demonstrates flexing-characteristics which allow a carton to make the transition over the sensor rollers when a part of the carton sags below the top carrying surfaces of the conveyor rollers. A carbon fiber shaft 9 is characterized by greater yield strength, so that when deflected, it returns to its original rectilinear condition. Steel or aluminum tube or rod shafts ultimately take on a permanent bend. As the sensitivity of the sensor is increased, the ruggedness of the sensor must be retained. The use of a carbon fiber shaft is a key factor to sensor longevity.

Figure 4:
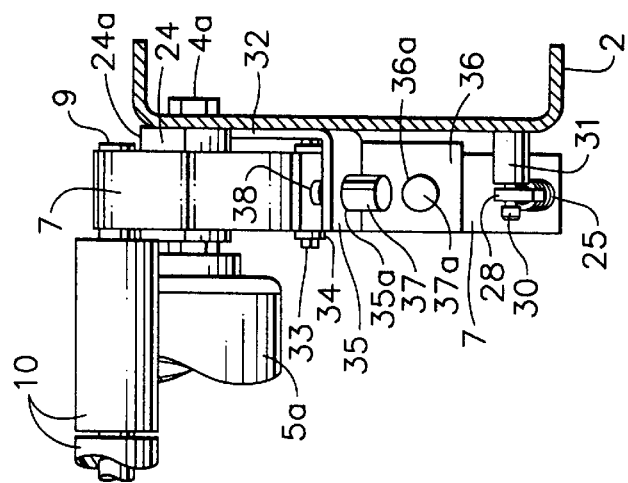
FIG. 4 is a fragmentary cross-sectional view taken along section line 4—4 of FIG. 1.

Sensor arm 7 and sensor arm 8 are identical. For this reason, a description of sensor arm 7 in conjunction with FIGS. 1, 3 and 4 can be considered as a description of arm 8 as well. Arm 7 is preferably made of plastic and lends itself well to be molded as an integral, one-piece structure.

Arm 7 comprises a central web 13 having an upper portion 13a, and intermediate portion 13b and a lower portion 13c. Along its rearward edge, arm 7 is provided with a transverse flange 14 extending from the lower end of arm 7 to the upper end of arm 7 and transversely to either side of web 13. At the upper end of arm 7 the flange 14 terminates in a circular flange 15 which extends to either side of web 13 and surrounds the opening 16 which receives shaft 9. From circular flange 15 a transverse flange 17 extends along the front of arm 7 on both sides of web 13, merging with flange 14 as at 18, surrounding a hole 19 in arm 7, the purpose of which will be apparent hereinafter. The flange 17 is also joined to flange 14 by a transverse flange 20, located on either side of web 13b. Finally, arm 7 is provided with a downwardly extending branch of flange 17 shown at 17a. The flange 17 and the flange 17a lie along two sides of a substantially triangular web 21 which is co-planar with web 13.

Sensor arm 7 has an opening 22 formed in web portion 13b. The opening 22 is defined by rear flange 14, transverse flange 20 and an arcuate opening edge 22a extending therebetween. It will be noted that transverse flange 20 and rear flange 14 meet at substantially a right angle so that opening 22 has a substantially 90 degree corner 22b, the purpose of which will be apparent hereinafter.

A knife-edge bearing 23 is fixedly and non-rotatively mounted on hexagonal shaft 4a. Knife-edge bearing 23 provides an edge bearing surface 23a which engages sensor arm 7 at the corner 22b of opening 22 therein. This arrangement enables sensor arm 7 to pivotally shift between a normal position shown in FIG. 1 and a fully depressed position illustrated in FIG. 2. The knife-edge bearing 23 is also shown in FIG. 3. A similar knife-edge bearing 24 is mounted adjacent the other end of shaft 4a and provides a knife-edge bearing surface 24a. Thus, sensor arms 7 and 8 are mounted on knife-edge bearings 23 and 24, respectively. It will now be apparent, particularly from FIG. 3, that conveyor roller 5a is shorter than the other conveyor rollers 5 to make room for knife-edge bearings 23 and 24 on shaft 4a.

When the sensor assembly 6 is in its normal, unactuated position, the sensor rollers 10 will be located slightly above the adjacent conveyor rollers 4a and 4. Sensor arm 7 will be in the position shown in FIG. 1. It will be understood that sensor arm 8 will assume the same position shown in FIG. 1 by virtue of the fact that it is operatively attached to sensor arm 7 by shaft 9.

Figure 2:
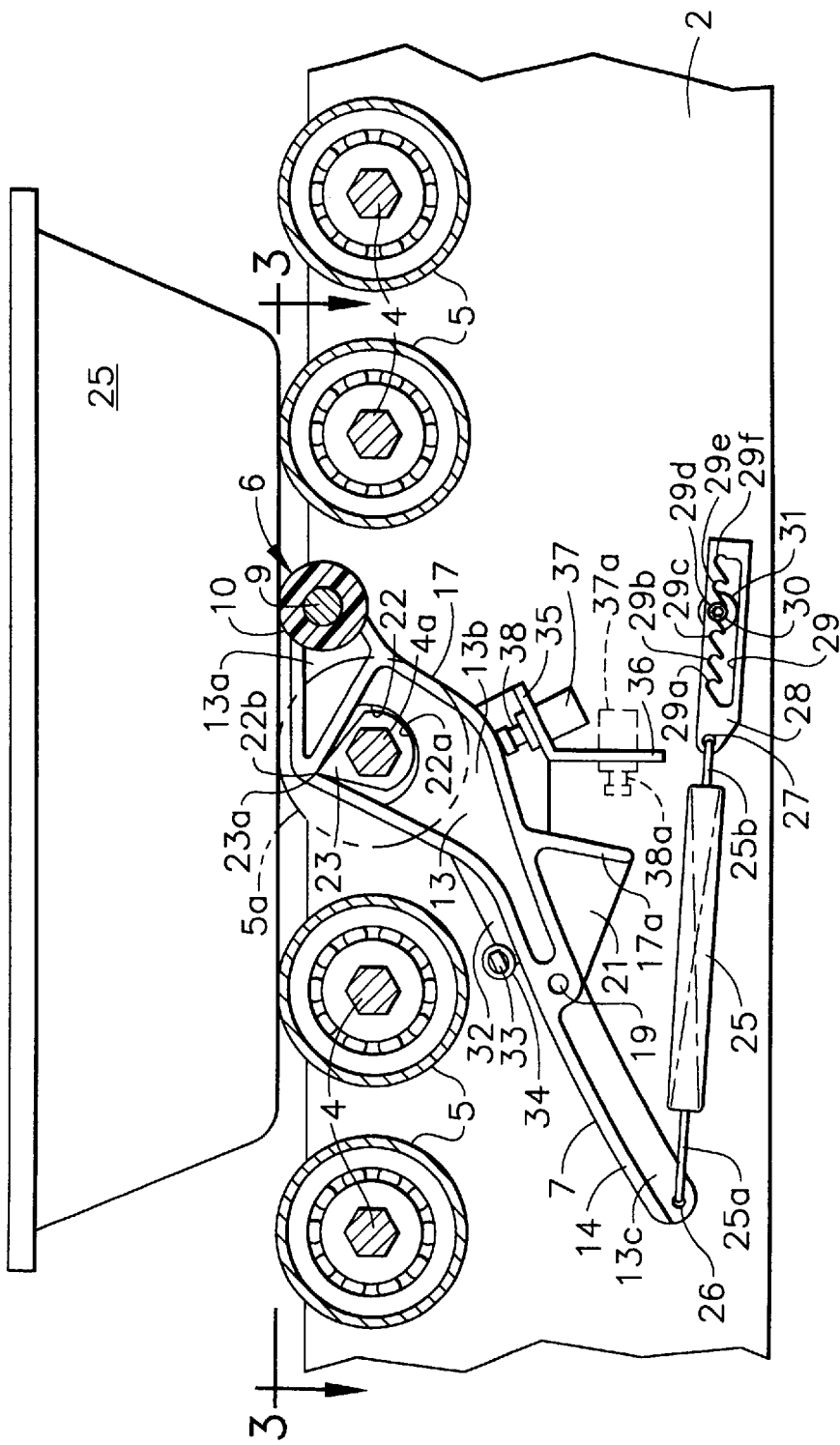
FIG. 2 is a fragmentary, longitudinal cross-sectional view, similar to FIG. 1, and illustrating the sensor assembly in its actuated position caused by an object passing thereover.

When an object such as empty carrier tray 25 passes over sensor rollers 10, sensor arm 7 may assume its fully depressed position shown in FIGS. 2 and 3. In this position, the uppermost surface portions of sensor rollers 10 will be co-planar with the uppermost surface portions of conveyor rollers 5 and 5a. Once again, sensor arm 8 will assume the same rotative position by virtue of the fact that it is connected to sensor arm 7 by shaft 9. The movement of sensor arm 7 between the unactuated position of FIG. 1 and fully depressed position of FIG. 2, and the similar movement of sensor arm 8, is a rocking or pivoting movement about knife-edge fulcrum bearings 23 and 24.

In order to return the sensor assembly 6 from its depressed position shown in FIG. 2 to its unactuated position shown in FIG. 1, a lightweight balance or tension spring 25 is provided. The rearward end 25a of balance spring 25 is hooked through a perforation 26 in the lowermost end portion of sensor arm 7. The forward end 25b of return spring 25 is hooked through an opening 27 in a tension adjustment bracket 28. Adjustment bracket 28 has a longitudinal slot 29 formed therein through which a shoulder bolt 30 passes. The shoulder bolt 30 extends through a spacer 31 and is threadedly engaged in conveyor side frame 2. The elongated slot 29 in tension adjustment bracket 28 has a series of angular notches 29a through 29f and the shoulder bolt 30 can be engaged in any one of the notches 29a through 29f to adjust the tension of spring 25. The tension of spring 25 must be enough to return and maintain the sensor rollers 10 in their normal, unactuated position shown in FIG. 1 and to overcome the spring of the plunger actuator of a three-way valve to be described hereinafter. It will be understood by one skilled in the art, for example, that the wider the conveyor 1, the longer will be shaft 9 and the greater will be the number of sensor rollers 10. This, in turn, increases the weight of sensor assembly 6 which can be accommodated by the tension adjustment bracket 28. Tension spring 25 and tension adjustment bracket 28 will be sufficient for the entire sensor assembly 6 and there is no need for a spring equivalent to spring 25 or a tension bracket equivalent to bracket 28 for sensor arm 8.

Affixed to the inside surface of conveyor side frame 2, adjacent sensor arm 7, there is a plate-like bracket 32. At its rearward end, bracket 32 has an integral in-turned lug 33 surrounded by a tubular segment 34 of resilient material such as plastic or rubber. The lug 33 and the resilient tube 34 thereabout serve as a stop for sensor arm 7 to prevent sensor arm 7 from going beyond its fully depressed position shown in FIG. 2.

The bracket 32 also has an in-turned portion 35 (see also FIG. 4) which slopes upwardly and forwardly as illustrated. Along its lowermost edge, in-turned portion 35 has an integral downwardly depending portion 36. Portions 35 and 36 are provided with perforations 35a and 36a (again see FIG. 4), either one of which may receive the body of a three-way pneumatic valve. In FIGS. 1 and 2, such a pneumatic valve is shown in solid lines at 37 extending through perforation 35a of bracket portion 35. A similar pneumatic valve is shown in broken lines in an alternate position extending through the perforation 36a in bracket portion 36, and is indicated at 37a. When the three-way valve is mounted in perforation 35a of bracket portion 35, as shown at 37 in FIGS. 1 and 2, it will be noted that the actuating valve stem 38 thereof will be depressed by flange portion 17 of sensor arm 7 when in its normal, unactuated position. When the three-way valve is alternatively mounted in the perforation 36a of bracket portion 36, as shown at 37a in FIG. 1, the actuator valve 38a thereof will be depressed by flange portion 17a of sensor arm 7 when in its normal, unactuated position. It will be noted from FIG. 2, however, that when sensor arm 7 is in its fully depressed position, the actuating plunger of the three-way pneumatic valve will be released, whether the pneumatic valve is mounted in perforation 35a of flange portion 35 (as at 37) or in perforation 36a of flange portion 36 (as at 37a). It is preferred to configure sensor arm 7 to release the actuating plunger when sensor arm has traveled only about ⅓ or ½ the distance from its normal unactuated position to its fully depressed position. Thus a lightweight conveyed object can be sensed even if it does not fully depress the sensor assembly.

It will be understood that there will be only one bracket 32 and one pneumatic valve 37 for each individual sensor assembly 6 used on a conveyor.

In the embodiment illustrated, bracket 32 and balance spring 25 are both shown adjacent conveyor side frame 2. It will be understood by one skilled in the art, that since sensor arms 7 and 8 are identical, a mirror image of bracket 32 and the three-way valve 37 could be mounted on the other side frame 3 of conveyor 1, and the same is true of spring 25 and tension adjust bracket 28. While not required, it is preferable to have these elements mounted on the same side frame of conveyor 1.

The invention having been described in detail, its operation may now be set forth. As indicated above, the sensor assembly 6 for lightweight objects of the present invention can be used for a number of purposes. For an exemplary showing only, it will be assumed that the sensor assembly 6 is located in a conveyor zone and is intended to activate and deactivate the rollers of an upstream zone, such as the next adjacent upstream zone, for example. When the sensor assembly 6 detects the presence of an object in its zone, it will release the valve actuator 38 of three-way valve 37 or the valve actuator 38a of three-way valve 37a to disconnect the conveyor rollers of the next preceding zone from their respective drive means. When no object is detected by sensor assembly 6, it will depress the actuating plunger 38 of three-way valve 37 or the actuating plunger 38a of threeway valve 37a causing the rollers of the adjacent preceding upstream zone to be engaged by their drive means and to be driven thereby.

When the sensor assembly 6 is in its normal position, as illustrated in FIG. 1, it is maintained in this position by balance spring 25. As indicated above, spring 25 must be of sufficient strength to overcome the weight of the rollers 10 and shaft 9 and the slight force of spring biased valve actuator 38 or 38a. Proper tension of spring 25 is achieved through the use of tension adjust bracket 28. The use of spring 25 is preferred over the use of a threaded counterbalance because the spring 25 does not add weight or inertia to the sensor assembly 6.

The use of multiple sensor rollers results in the fact that the object being conveyed need rotate only those rollers it contacts. This further reduces the inertia of the system.

Of primary importance are the knife-edge fulcrum bearings 23 and 24. In prior art practice, the sensor arms rotate about a shaft having a diameter of 0.38 inch or more. The sensor arms 7 and 8 of the present invention rock about knife-edge fulcrum bearings presenting a radius of about 0.03 inch. Under these circumstances, the friction goes substantially to zero.

Figure 5:
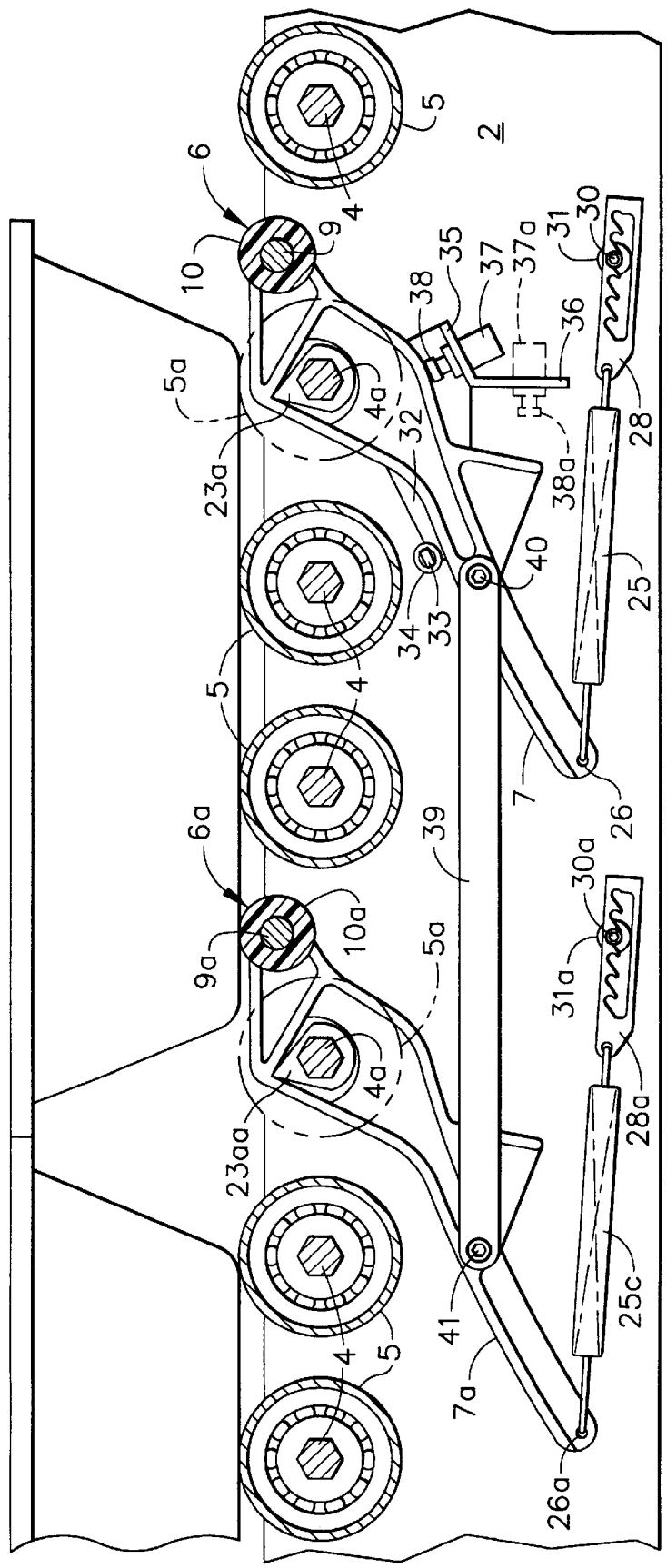
FIG. 5 is a longitudinal cross-sectional view, similar to FIGS. 1 and 2, illustrating the use of a pair of interconnected sensor assemblies of the present invention.

Reference is now made to FIG. 5. This Figure illustrates a dual sensor assembly made up of a first sensor assembly generally indicated at 6 and a second sensor assembly generally indicated at 6a.

There are instances where, by virtue of the shape of the objects being conveyed, one or more objects could occupy a zone without actuating the sensor. An example of such a situation is illustrated in FIG. 5 wherein the objects being conveyed are tray-like objects having ends which slope downwardly and inwardly and having an upper peripheral flange. As a result of this, the length dimension of each tray is greater at its top than at its bottom. Thus, when the upper flanges of a pair of adjacent trays are abutting, their bottom surfaces are spaced from each other. In addition, the forwardmost end of the first tray may overlie the rollers of sensor assembly 6, but the bottom of the tray may not contact these rollers.

To avoid this problem, it is within the scope of the invention to provide two substantially identical sensor assemblies 6 and 6a having their rollers 10 and 10a spaced apart such that one or the other set of rollers 10 and 10a will be depressed by the tray. As indicated above, the sensor assemblies 6 and 6a are substantially identical. The sensor arms 7 and 7a are joined together by a link 39. At one end, the link 39 is pivoted as at 40 to the opening 19 (see FIG. 1) in sensor arm 7. At the other end, the link 39 is pivoted as at 41 to the same hole (not shown) in arm 7a. It will be understood that while link 39 is illustrated connecting sensor arms 7 and 7a, the link 39 could connect the arms on the other side of the conveyor. There will be only one bracket 32 with its stop 34 and valve mounting portions 35 and 36. Both arms 7 and 7a may be provided with balancing springs 25 and 25a, tension adjustment brackets 28 and 28a, and shoulder bolts 30 and 30a, respectively. Alternatively, the spring 25a, the adjustment bracket 28a and the shoulder bolt 30a can be eliminated if spring 25 is replaced with a spring appropriately selected with a greater spring rate and a higher initial tension.

The sensor assembly 6–6a of FIG. 5 operates in exactly the same manner as the sensor of FIGS. 1, 2 and 3. The only difference lies in the fact that if sensor rollers 10a of the system are depressed by a tray being conveyed, the rollers 10 will similarly be depressed by link 39, even though they are not contacted by the tray being conveyed.

From the above it will be apparent that the sensor system of the present invention is characterized by a low sensing force due to the knife-edge fulcrum bearings, very light construction and a low total mass. As a result, lighter weight objects can be conveyed at a greater speed and the sensor assembly can sense lighter weight objects than hitherto possible by prior art mechanical sensing devices.

Modifications may be made in the invention without departing from the spirit of it. For example, it would be within the scope of the invention to make each fulcrum bearing an integral, one-piece part of its respective sensor arm. As an example, FIG. 7 shows a sensor arm 42 similar to sensor arms 7 and 8, but extruded as an open frame structure without intermediate web portions 13a, 13b, 13c and 21. A fulcrum balance 43, similar to fulcrum balances 23 and 24, constitutes an integral, one-piece part of arm 42. Instead of a knife-edge (as provided by fulcrum bearings 23 and 24) the fulcrum 43 is connected to arm 42 by a thin web 44 constituting a hinge frequently referred to in the plastic art as a "living hinge". A living hinge may be defined as a thin plastic web connecting, and integral with, two parts, one of which is swingable with respect to the other by virtue of the web.

What is claimed:

1. A sensor assembly for detecting the presence of a lightweight object on a conveyor of the type having side frames and a plurality of rollers rotatively mounted on shafts fixed between said side frames, said sensor assembly comprising a pair of fulcrum bearings mounted on a selected one of said conveyor roller shafts adjacent said side frames and with said conveyor roller of said selected shaft therebetween, a pair of sensor arms mounted on and rockable about said fulcrum bearings, said sensor arms each having upper and lower ends, said upper ends of said sensor arms being joined by a shaft having at least one sensor roller rotatively mounted thereon, said sensor assembly being rockable between a normal position wherein said at least one sensor roller extends partway above the adjacent ones of said conveyor rollers and a fully depressed position wherein the uppermost surface of said at least one sensor roller and said uppermost surfaces of adjacent conveyor rollers are co-planar, a balancing device normally maintaining said sensor assembly in said normal position, and a two-state device mounted on one of said conveyor side frames, near the adjacent sensor arm, said two-state device having an actuator, said adjacent sensor arm engaging said actuator when said sensor assembly is in said normal position maintaining said two-state device in the first of said states, said adjacent sensor arm releasing said actuator when said sensor assembly is shifted at least partway toward its fully depressed position to shift said two-state device to the second of said states.

2. The sensor assembly claimed in claim 1 wherein said balancing device comprises a tension spring, said tension spring having a first end attached to said lower end of one of said sensor arms and a second end adjustably connected to the adjacent one of said conveyor side frames.

3. The sensor assembly claimed in claim 1 wherein said two-state device comprises an air valve and said actuator comprises a valve stem.

4. The sensor assembly claimed in claim 1 including a plurality of sensor rollers rotatively mounted on said shaft connecting said upper ends of said sensor arms.

5. The sensor assembly claimed in claim 1 wherein each arm is provided with an opening through which its respective fulcrum bearing extends, each opening being shaped to provide a corner engaged by its respective fulcrum bearing.

6. The sensor assembly claimed in claim 5 wherein said fulcrum bearings are knife-edge fulcrum bearings.

7. The sensor assembly claimed in claim 5 wherein said fulcrum bearing of each arm is an integral one-piece part of its respective arm, connected to said corner by a thin web constituting a living hinge.

8. The sensor assembly claimed in claim 1 wherein said sensor assembly comprises a first sensor assembly, and including a second sensor assembly comprising a pair of fulcrum bearings mounted on a second selected one of said conveyor roller shafts adjacent said side frames with said conveyor roller of said second selected shaft therebetween, said second conveyor roller further comprising a pair of sensor arms mounted on and rockable about said fulcrum bearings of said second sensor assembly, said sensor arms of said second sensor assembly having upper and lower ends with a shaft joining said upper ends and rotatively supporting at least one sensor roller, said arms of said second sensor assembly being rockable between a normal position wherein said at least one sensor roller extends partway above the adjacent ones of said conveyor rollers and a fully depressed position wherein the uppermost surface of said at least one sensor roller of said second sensor assembly and said uppermost surfaces of said adjacent conveyor rollers are co-planar, at least one balancing device normally balancing said first and second sensor assemblies in said normal position, a link being pivotally attached to one sensor arm of said first sensor assembly and the corresponding sensor arm of said second sensor assembly so that if either sensor assembly is shifted from its normal position toward its fully depressed position the other sensor assembly will also be shifted toward its fully depressed position by virtue of said link, whereby said two-state device of said first sensor assembly will be shifted to its second state.

9. The sensor assembly claimed in claim 8 wherein said fulcrum bearings are knife-edge fulcrum bearings.

10. The sensor assembly claimed in claim 8 wherein said fulcrum bearing of each arm is an integral one-piece part of its respective arm, connected to its respective arm by a thin web constituting a living hinge.

11. The sensor assembly of claim 2 including an elongated tension adjustment bracket having a longitudinal slot therein, said slot having a longitudinal edge with a plurality of notches formed therein, a shoulder bolt passing through said tension adjustment bracket slot and being attached to said adjacent conveyor side frame, said shoulder of said bolt being engageable in any one of said notches to adjust the tension of said tension spring.

12. The sensor assembly claimed in claim 2 including a plurality of sensor rollers rotatively mounted on said shaft connecting said upper ends of said sensor arms.

13. The first and second sensor assemblies claimed in claim 8 wherein said balancing device for said first sensor assembly comprises a first tension spring, said first tension spring having a first end attached to said lower end of one of said sensor arms of said first sensor assembly and a second end adjustably connected to the adjacent one of said conveyor side frames, said balancing device for said second sensor assembly comprising a second tension spring, said second tension spring having a first end attached to the lower end of the corresponding one of said sensor arms of said second sensor assembly and a second end adjustably connected to said adjacent one of said conveyor side frames.

14. The first and second sensor assemblies claimed in claim 8 wherein said balancing device for both sensor assemblies comprises a tension spring having a first end attached to said lower end of one of said sensor arms and a second end adjustably connected to the adjacent one of said conveyor side frames.

15. The first and second sensor assemblies claimed in claim 8 including a plurality of sensor rollers rotatively mounted on said shaft connecting said upper ends of said sensor arms of said first sensor assembly and on said shaft connecting said upper ends of said sensor arms of said second sensor assembly.

16. The sensor assembly claimed in claim 12 including said conveyor, said conveyor being divided into zones, said sensor assembly being located in one of said zones, an identical sensor assembly being located in at least selected ones of the remaining zones, each zone having a drive assembly for its conveyor rollers shiftable between a state wherein it drives its conveyor rollers and a state wherein it does not drive its conveyor rollers, said two-state device of each sensor assembly being connected to the drive assembly of at least one upstream zone, each two-state device when in its first state maintaining its respective drive assembly in its driving state, and each two-state device, when shifted to its second state by its respective sensor arm, shifting its respective drive assembly to its nondriving state.

17. The sensor assembly claimed in claim 1 wherein said shaft joining said upper ends of said sensor arms comprises a carbon fiber shaft.

18. The sensor assembly claimed in claim 4 wherein said shaft joining said upper ends of said sensor arms comprises a carbon fiber shaft.

19. The first and second sensor assemblies claimed in claim 8 wherein said shaft connecting said upper ends of said sensor arms of said first sensor assembly and said shaft connecting the upper ends of said arms of said second sensor assembly comprise carbon fiber shafts.

20. The sensor assembly claimed in claim 12 wherein said shaft joining said upper ends of said sensor arms comprises a carbon fiber shaft.

21. The first and second sensor assemblies claimed in claim 15 wherein said shaft connecting said upper ends of said sensor arms of said first sensor assembly and said shaft connecting the upper ends of said arms of said second sensor assembly comprise carbon fiber shafts.

* * * * *